United States Patent [19]
Weisburn et al.

[11] Patent Number: 5,697,498
[45] Date of Patent: Dec. 16, 1997

[54] CARRYING CASE FOR RECORDED MEDIA

[75] Inventors: James T. Weisburn, Massillon; Ronald M. Marsilio, Mogadore, both of Ohio

[73] Assignee: Fellowes Mfg. Co., Itasca, Ill.

[21] Appl. No.: 709,744

[22] Filed: Sep. 9, 1996

[51] Int. Cl.$^6$ ............................................. B65D 85/57
[52] U.S. Cl. ................... 206/308.1; 206/310; 206/311
[58] Field of Search .......................... 206/303, 307, 206/307.1, 308.1, 308.2, 308.3, 309–313, 387.13, 472, 748

[56] References Cited

U.S. PATENT DOCUMENTS

| | | | |
|---|---|---|---|
| 4,502,569 | 3/1985 | Saetre et al. | 206/387 |
| 4,762,225 | 8/1988 | Henkel | 206/311 |
| 4,765,469 | 8/1988 | Seifert | 206/309 |
| 5,161,682 | 11/1992 | Seifert et al. | 206/309 |
| 5,188,228 | 2/1993 | Barrett | 206/308.1 |
| 5,246,107 | 9/1993 | Long et al. | 206/309 |
| 5,295,577 | 3/1994 | Minter | 206/312 |
| 5,322,162 | 6/1994 | Melk | 206/308.1 |
| 5,590,767 | 1/1997 | Li | 206/308.1 |

*Primary Examiner*—Jimmy G. Foster
*Attorney, Agent, or Firm*—Brinks Hofer Gilson & Lione

[57] ABSTRACT

A carrying case for storing disc-shaped data storage media and associated printed graphics. The case includes a base hingedly connected to a lid by a hinge panel. A one-piece page assembly is hingedly mounted on the base and includes a plurality of first hinge pages hingedly and alternately connected to a plurality of second hinge pages by a pair of flexible hinge straps. The first hinge pages pivot toward and latch to the second hinge pages to form a stack of hingedly joined multi-media pages. Each multi-media page includes a pair of central hubs for holding a pair of compact discs. Each first page includes a pair of outwardly extending tapered tabs which cooperates with the tabs of an adjacent page to produces a cam action between adjacent multi-media pages. The manual pivotal movement of one multi-media page toward a horizontal position causes the tabs of the adjacent page to interact moving the adjacent multi-media page to an upright position for ease of removal and insertion of the recorded media and graphics. A side loading graphics pocket is formed between the first and second pages in each multi-media page which receives and stores graphics and prevents the graphics from sliding therefrom when the multi-media pages are flipped between the horizontal and upstanding positions. Multiple page assemblies can be interconnected to allow the case to store a multiplicity of disc-shaped data storage media.

17 Claims, 5 Drawing Sheets

CARRYING CASE FOR RECORDED MEDIA

BACKGROUND OF THE INVENTION

1. Technical Field

The invention relates to a carrying case. More particularly, the invention relates to a carrying case for storing and carrying a plurality of disc-shaped data storage media and their associated graphics. Even more particularly, the invention relates to a carrying case which uses a plurality of hingedly connected multi-media pages to hold the recorded media and allow a user to peruse the recorded media by flipping through the multi-media pages.

2. Background Information

The emergence of the compact disc as a preferred data storage medium has led to the use of compact discs in various commercial industries, for example the music industry uses compact discs to store and play musical recordings, the video game industry uses compact discs to store and play games, and the computer industry uses compact discs to store and use software for multi-media applications.

Some of these compact disc applications require multiple compact discs to store all of the digitized data. For example, many compact disc audio albums are recorded on multiple compact discs, and longer multi-media applications require multiple compact discs to perform their particular functions. These multiple compact disc applications must be packaged in a case capable of storing a plurality of these compact discs.

Also, users often wish to carry a plurality of audio compact discs in their car or along with a portable compact disc player. Currently, most compact discs are packaged and sold in a polystyrene transparent plastic case, commonly referred to as a "jewel box". These jewel boxes are brittle and break easily when dropped on a hard surface or when mishandled. Once broken, these jewel boxes are incapable of adequately protecting the enclosed compact disc, and thus the compact disc will be exposed to dust, debris or damage. Further, because of the enlarged size and weight of the compact discs while enclosed in their jewel box, the user may wish to carry a plurality of compact discs within one storage case free of their jewel boxes.

Many prior art storage cases to store recorded media have been developed, such as shown in U.S. Pat. No. 5,370,224 which includes a base member with an engagement portion, and a flexible sheet. The base member and the flexible sheet form a pocket for holding a compact disc. A case body comprises a housing member which houses the disc holder and a mounting member which is engaged by the disc holder.

U.S. Pat. No. 5,246,107 discloses another compact disc storage unit with a plurality of disc receiving plates, each of which supports one compact disc. The plates are alternately hinged to one another in an accordion type manner which causes the plates to flip and present the discs to the user for viewing and removal.

U.S. Pat. No. 5,180,058 discloses an expandable disc holder assembly which includes front and back cartridges and one or more intermediate cartridges detachably and pivotally secured to the front and back cartridges or to each other. The intermediate cartridges are adaptable to hold either a CD or floppy diskette.

U.S. Pat. No. 5,176,250 discloses a disk storage box which includes two pivoted shells connected by two axle caps with a shaft retained therebetween to hold a plurality of flat disk holders. Lifting one shell from the other causes the axle caps to rotate the hollow shaft, permitting the flat disk holders to be spread out like a fan. Stop strips are made in connecting rings on one shell to confine the axle cap to be rotated within a fixed angle.

U.S. Pat. No. 5,027,950 discloses a support and display assembly for holding a plurality of thin lightweight objects and includes a support frame with a plurality of parallel holder structures rotatably mounted therein and pivotal between two oppositely disposed angularly oriented positions. Movement of one of the holders will move the adjacent holder into an easy viewing position.

U.S. Pat. No. 5,022,516 discloses a storage container for flat recording media comprising a lid pivotally connected to a bottom and a pocket turnably coupled to the lid so that the pocket can be swiveled into or out of a substantially parallel position with respect to the lid. An arcuate edge having an elongate guide element is formed laterally on the pocket to guide the lid and open the pocket during swiveling.

U.S. Pat. No. 4,844,260 discloses a computer disc packing box with two pivotally jointed seats, a plurality of disc storage bags, upper and lower covers and two cover plates. Grooves are formed on the inner sides of the two opposite pivotally-jointed seats, and legs on the two sides of the bottom edge of the disc storage bags are inserted therein for pivotal movement.

U.S. Pat. No. 4,538,730 discloses a collapsible storage box for floppy disks which includes a casing containing a plurality of bags for storing the disks.

Further examples of cases for storing recorded media are shown in U.S. Pat. Nos. 5,201,414, 5,009,995, 4,778,047, 4,535,888, 4,047,315, 3,446,360, 3,374,794 and 3,323,243.

Although these prior art storage cases are adequate for the purpose for which they are intended, they fail to provide a case with a plurality multi-media pages which are hingedly connected to one another and rotate about a common central axis, and which have a side-loaded pocket for storing graphics.

Therefore, the need exists for a carrying case for recorded media which includes a plurality of hinge pages for storing compact discs, which hinge pages are injection molded as a one-piece member and snap together to form a multi-media page which stores one compact disc on each side thereof, and which pivots between a plurality of different positions for ease of viewing and gaining access to the stored media, and in which a side-loaded pocket is formed between the hinge pages which receives the graphics and prevents the graphics from sliding out of the case when the pages are flipped for viewing by the user. There is no such carrying case of which we are aware that accomplishes these results.

SUMMARY OF THE INVENTION

Objectives of the invention include providing an improved carrying case for recorded media which is relatively compact in size and which can be mass produced relatively inexpensively from a lightweight molded plastic material.

A further objective is to provide such a case which has a plurality of hinge pages which are injection molded as a one-piece member, and in which each hinge page includes a hub which frictionally engages the central opening formed in a usual compact disc to retain the compact disc on the hinge page.

Another objective is to provide such a case in which each hinge page snap-fits with an adjacent hinge page to form a multi-media page; in which each multi-media page is capable of holding one compact disc on each side thereof; and in which a side-loaded pocket is formed between the hinge pages for storing graphics.

A still further objective is to provide such a case in which the multi-media pages are hingedly connected to one another and rotate about a common central axis.

Another objective is to provide such a case in which the multi-media pages produce a cam action therebetween wherein pivoting a first multi-media page toward a horizontal position causes an adjacent second multi-media page to pivot to an angularly upstanding position to allow for easy viewing and removal of the compact disc held on the second multi-media page.

These objectives and advantages are obtained by the carrying case for recorded media of the present invention, the general nature of which may be stated as including a base; a lid; first hinge means for hingedly connecting said base to said lid to form a storage chamber therebetween; a page assembly pivotally mounted within the storage chamber, said page assembly including a plurality of first and second pages each having first and second ends wherein the first end of said first pages is hingedly connected to the second end of an adjacent one of said second pages, wherein the second end of said first pages is hingedly connected to the first end of another adjacent one of said second pages, and wherein outermost first and second pages include first and second free ends, respectively, second hinge means for hingedly connecting said first pages to said second pages, latching means formed on said first and second pages for latching said first pages in juxtaposition to said second pages to form a plurality of multi-media pages, with a graphics storage compartment being formed between said first and second pages in each of said multi-media pages, and a hub formed on an outer surface of each of said first and second pages for supporting a disc-shaped data storage medium on said outer surface; and third hinge means for pivotally mounting said page assembly in said storage chamber.

BRIEF DESCRIPTION OF THE DRAWINGS

The preferred embodiments of the invention, illustrative of the best modes in which applicants have contemplated applying the principles, are set forth in the following description and are shown in the drawings and are particularly and distinctly pointed out and set forth in the appended claims.

Similar numbers refer to similar parts throughout the drawings.

DESCRIPTION OF THE PREFERRED EMBODIMENTS

Figure 1:
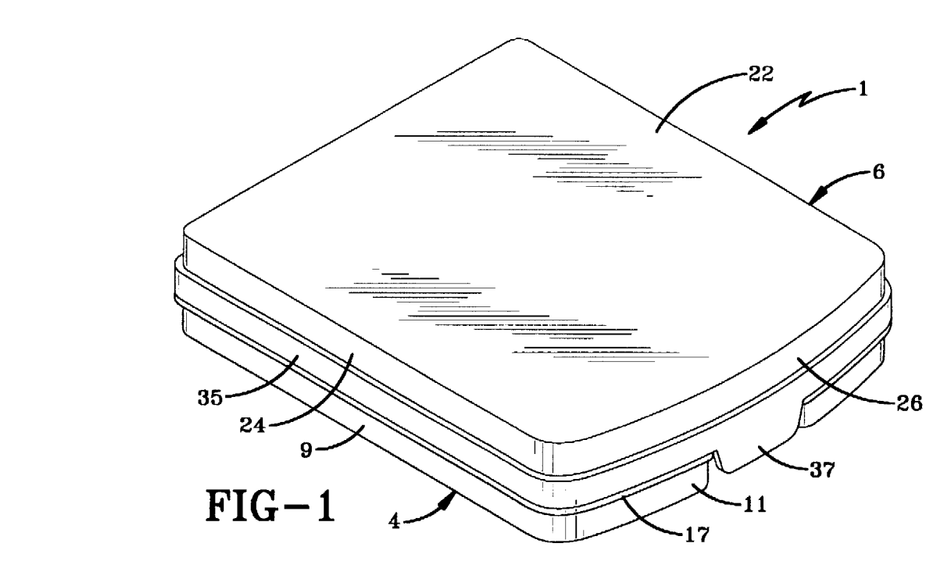
FIG. 1 is a perspective view of the carrying case of the present invention shown in a closed position.

A first embodiment of the carrying case of the present invention is shown in FIG. 1, and is indicated generally at 1. Case 1 is molded preferably of a plastic material, such as polypropylene, and includes a base 4 and a closure lid 6. Base 4 has a four-sided rectangular-shaped flat bottom wall 8 (FIG. 2) with upstanding spaced parallel side walls 9 and 10, and an upstanding front wall 11.

Walls 9-11 are formed integrally with bottom wall 8 and are arranged in a U-shaped configuration with walls 9 and 10 curved slightly inwardly around the rear end of base 4. A peripheral flange 17 extends outwardly from walls 9-11 adjacent an upwardly extending top edge 18 of the walls. Front wall 11 has an inwardly indented portion 16 formed in the center below top edge 18. A pair of ear shaped lugs 19 and 19a are formed integrally with and extend orthogonally from an inner surface of bottom wall 8 with each lug having an inwardly extending pivot pin 20.

Closure lid 6 has a four-sided top closure wall 22, generally similar in size and configuration to bottom wall 8 of base 4. Lid 6 includes upstanding parallel side walls 24 and 25, and an upstanding front wall 26. Walls 24-26 are formed integrally with closure wall 22 and are arranged in a U-shaped configuration with walls 24 and 25 curved slightly inwardly around the rear end of lid 6. An outwardly extending peripheral edge 35 of lid 6 is formed integrally with lid walls 24-26, and the lid walls terminate in stepped shoulders 24a, 25a and 26a which receive top edge 18 of base 4 when case 1 is in a closed position (FIG. 1) to provide a relatively dust free seal therebetween.

A latching flange 37 extends outwardly from the center of front wall 26 of lid 6 and has a generally truncated configuration with a pair of tapered sides 39. A tab 38 extends outwardly from flange 37 and catches under edge 18 of front wall 11 of base 4 to latch lid 6, when in the closed position as shown in FIG. 1.

Figures 2, 3, 4:
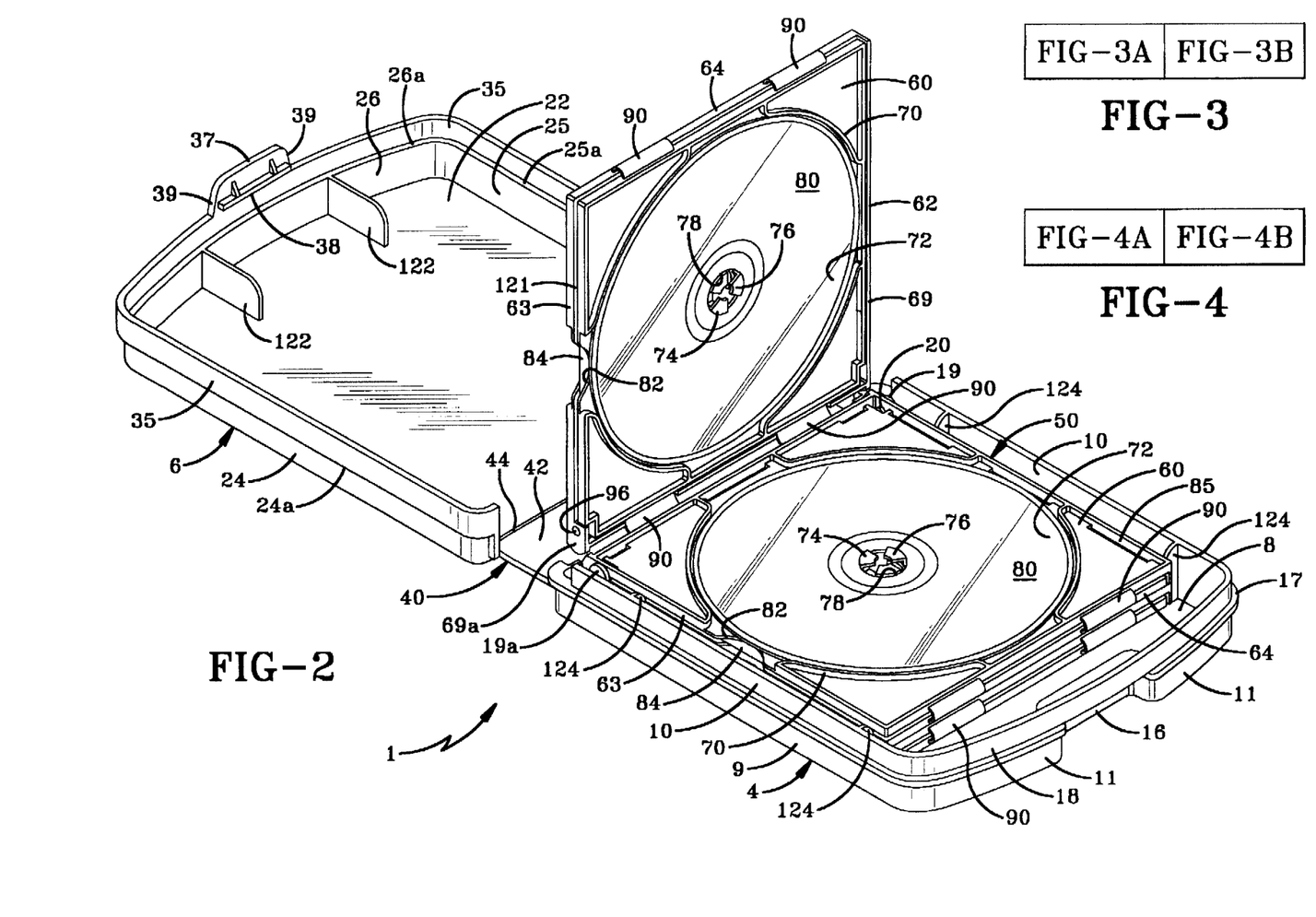
FIG. 2 is a perspective view of the case of FIG. 1 shown in a full open position with a first multi-media page pivoted to an upright vertical position.

Lid 6 is hinged movably mounted on base 4 by a double hinge panel, indicated generally at 40 (FIG. 2). Hinged panel 40 includes an elongated rectangular-shaped panel 42 which is pivotally connected between the rear edges of bottom wall 8 and top closure wall 22 by a pair of reduced thickness living hinges 44. Hinge panel 40 allows base 2 and lid 6 to move between the open position of FIG. 2 and the closed position of FIG. 1. Base 4, lid 6 and double hinge panel 40 form a storage chamber therebetween.

In accordance with one of the features of the invention, case 1 includes a page assembly, indicated generally at 50 in FIGS. 2, 3A, 3B, 4A and 4B, for holding disc-shaped recorded media and associated graphics. In the preferred embodiment, page assembly 50 includes six interconnected hinge pages, first hinge pages 52, 54 and 56, and second hinge pages 53, 55 and 57. Hinge pages 52–57 are generally similar to one another in construction and are all molded together in series as a one-piece member indicated generally at 59, from a plastic material, such as polypropylene.

Hinge pages 52–57 are formed with a four-sided rectangular-shaped flat bottom wall 60 (FIGS. 3A and 3B) having opposite parallel sides 62 and 63 and opposite parallel ends 64 and 65. A peripheral upstanding wall 68 extends from an outer surface 60a of bottom wall 60 and is formed integrally with four curved walls 70 which extend between each side 62 and 63, and each end 64 and 65 to define the periphery of a compact disc storage area 72. End 65 and side 62 of first hinge pages 52, 54 and 56 include a side wall 69 (FIGS. 2, 4A and 4B) which is formed integrally with and extends from an inner surface 60b of bottom wall 60. Side 63 of first hinge pages 52, 54 and 56 includes a side wall 69a (FIGS. 4A, 4B, 6 and 7) which extends from inner surface 60b of bottom wall 60 partially across side 63.

A usual hub 74 having a plurality of flexible tabs 76, is formed centrally on bottom wall 60 for insertion into a center opening 78 (FIGS. 2 and 5) formed in a usual compact disc 80 for frictionally retaining the disc adjacent bottom wall 60. A crescent-shaped indent 82 is formed centrally in side 63 of bottom wall 60 to facilitate easy removal of a graphics 84, as described below in further detail.

A plurality of slots 85 (FIGS. 3A and 3B) are formed in bottom wall 60 of first hinge pages 52, 54 and 56 adjacent wall 68 of side 62 and end 65. A latching shoulder 87 (FIG. 5A) extends inwardly from an inner surface of wall 69 below each slot 85. A plurality of latching tabs 86 extend downwardly from bottom wall 60 along side 62 and end 64 of second hinge pages 53, 55 and 57. Latching tabs 86 include a barbed end 86a, and align and interlock with latching shoulder 87 as described below.

Figure 3A:
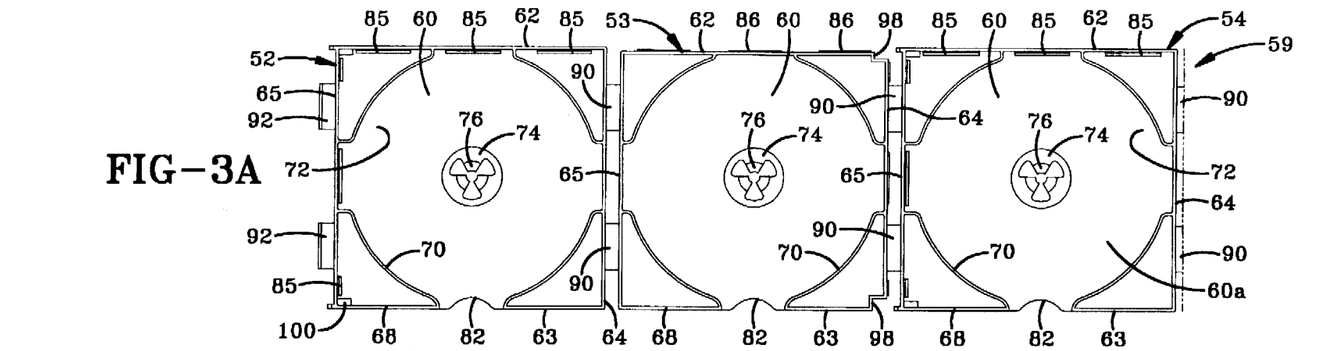
FIG. 3A is a top plan view of a first portion of the page assembly.
Figures 3B, 4A:
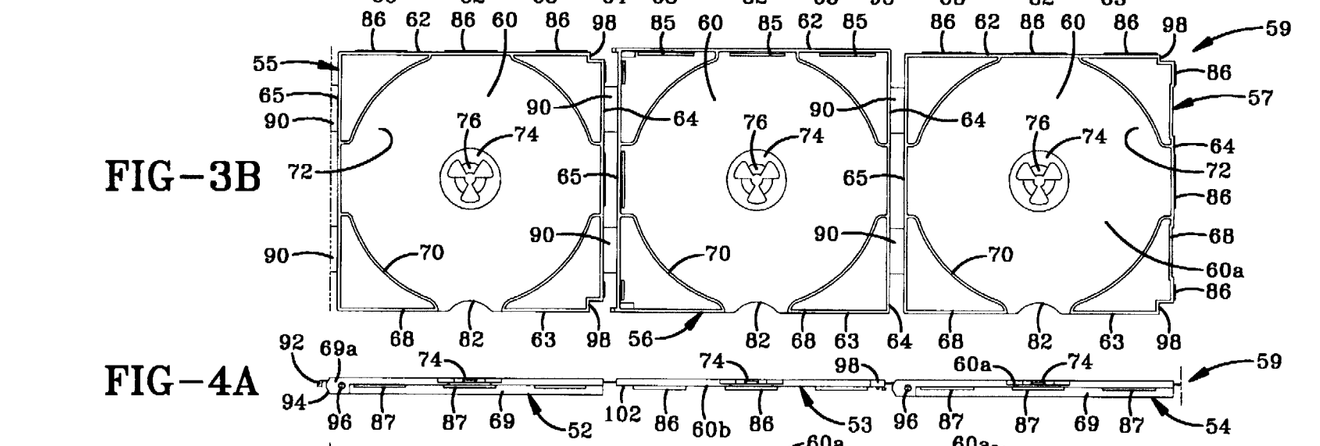
FIG. 3B is a top plan view of a second portion of the page assembly.
FIG. 4A is a side elevational view of the first portion of the page assembly of FIG. 3A.
Figure 4B:
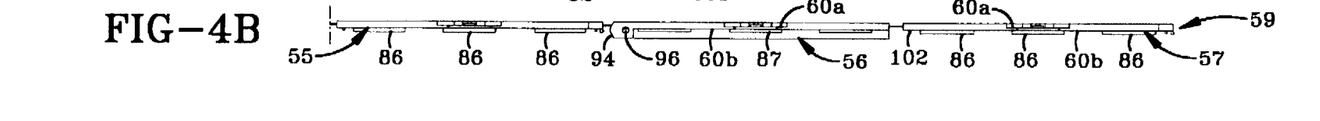
FIG. 4B is a side elevational view of the second page assembly of FIG. 3B.
Figure 5:
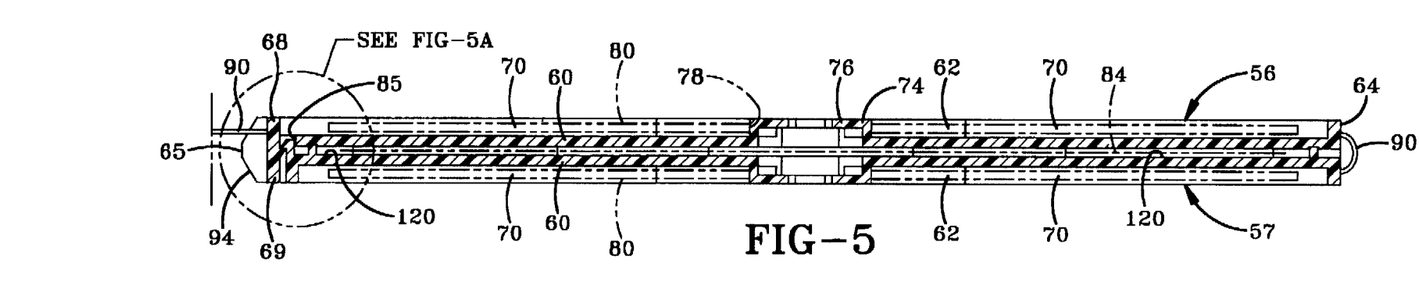
FIG. 5 is a sectional view of a multi-media page holding two compact discs and graphics.
Figure 5A:
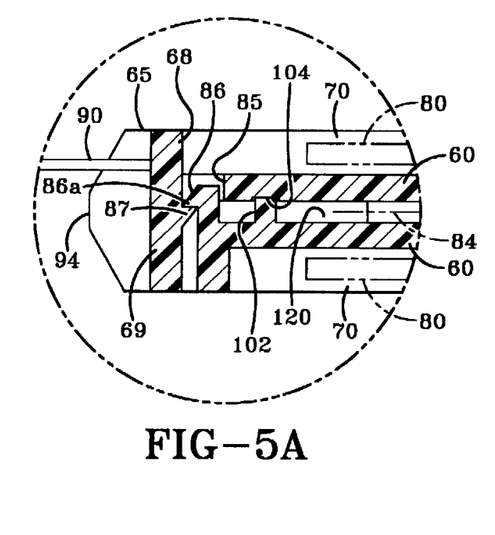
FIG. 5A is a greatly enlarged fragmentary sectional view of the encircled portion of FIG. 5.

In accordance with another feature of the invention, a pair of spaced parallel hinge straps 90 (FIGS. 3A-4B) extend from each hinge page 52–57 to join adjacent hinge pages with one another to form elongated strip member 59. Hinge straps 90 of hinge pages 53–57 extend outwardly from end 65 thereof to end 64 of respective adjacent hinge pages 52–56. Hinge straps 90 of hinge page 52 extend outwardly from end 65 thereof and have an L-shaped outer free end 92 (FIG. 4A). End 64 of hinge page 57 is free of hinge straps 90. Hinge straps 90 preferably are formed centrally on wall 68 of ends 64 and 65 of hinge pages 52–57, intermediate inner surface 60b of bottom wall 60 and the top edge of wall 68 (FIGS. 5 and 5A).

Figure 9:
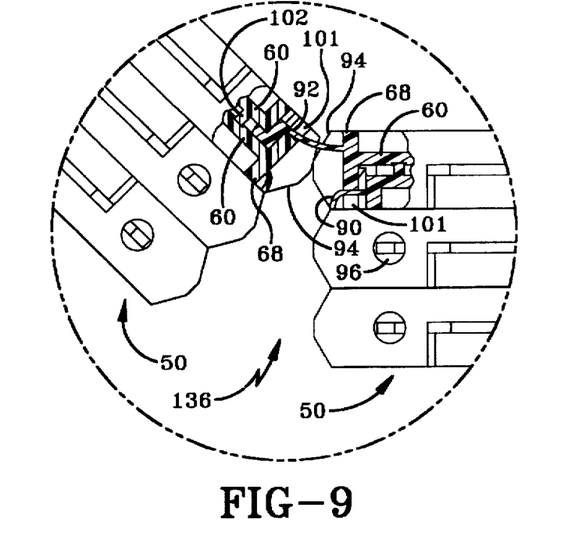
FIG. 9 is a greatly enlarged elevational view with a portion in section, showing the interconnection of two stacks of the page assemblies used in a second embodiment of the present invention.

In accordance with still another feature of the invention, walls 69 and 69a of first hinge pages 52, 54 and 56 include a tapered truncated tab or end 94 which extends outwardly beyond end 65. A circular hole 96 is formed in each wall 69 and 69a adjacent ends 94. An L-shaped cut-out 98 is formed in both corners of end 64 of second hinge pages 53, 55 and 57, and a rectangular-shaped opening 100 is formed in both corners of end 65 of first hinge pages 52, 54 and 56. A pair of generally U-shaped cut-outs 101 (FIG. 9) are formed in walls 69 of ends 65 of first hinge pages 52, 54 and 56 which align with hinge straps 90.

A pair of spaced parallel ridges 102 (FIGS. 4A, 4B, 5 and 5A) are formed on inner surface 60b of bottom wall 60 of second hinge pages 53, 55 and 57, parallel and adjacent to ends 64 and 65. A pair of complementary-shaped grooves 104 are formed in inner surface 60b of bottom wall 60 of first hinge pages 52, 54 and 56 and partially receive ridges 102 therein when hinge pages 52–57 are assembled, as described below.

When page assembly 50 is assembled, first hinge pages 52, 54 and 56 pivot about hinge straps 90 which extend from end 64 thereof, wherein inner surface 60b of bottom wall 60 of first hinge pages 52, 54 and 56 sits adjacent inner surface 60b of bottom wall 60 of second hinge pages 53, 55 and 57, respectively. The first pages are slightly greater in length and width than the second hinge pages to allow the first pages to sit juxtaposition to the second pages within walls 69 and walls 69a, wherein sides 63 of respective adjoining first and second hinge pages, and particularly indents 82 formed therein, align with one another.

Latching tabs 86 of the second hinge pages extend partially within aligned slots 85 of the respective first hinge pages, and barbed ends 86a thereof engage latching shoulders 87 to latch the first pages in juxtaposition to the second pages. First hinge pages 52, 54 and 56 interlock with second hinge pages 53, 55 and 57, respectively, as described above, to form multi-media pages 110, 112 and 114 (FIG. 6), respectively. Ridges 102 extend partially within grooves 104 and maintain a spaced relationship between bottom walls 60 of adjoining hinge pages forming a graphics storage compartment or pocket 120 therebetween. Each graphics pocket 120 has a periphery defined by side wall 69 and ridges 102, and a slotted opening 121 is formed between the edges of sides 63 of adjoining hinge pages which receives graphics 84. Cut-outs 98 align with rectangular openings 100 to receive pivot pins 20, as described below.

Page assembly 50 sits within the storage chamber and is retained therein by pivot pins 20 of lugs 19 and 19a. Pivot pins 20 extend into holes 96, openings 100 and cutouts 98 and pivotally mount page assembly 50 within base 4 and form a pivot axis around which multi-media pages 112, 114 and 116 pivot when the multi-media pages are flipped between a horizontal position (FIG. 6) and a vertically upright position (FIGS. 2 and 7). A pair of spaced parallel upright flanges 122 extend from the front of top closure wall 22 to hold page assembly 50 stationary when case 1 is in the closed position, and a plurality of upright flanges 124 extend inwardly from side walls 9 and 10 to center page assembly 50 within base 4.

Figure 6:
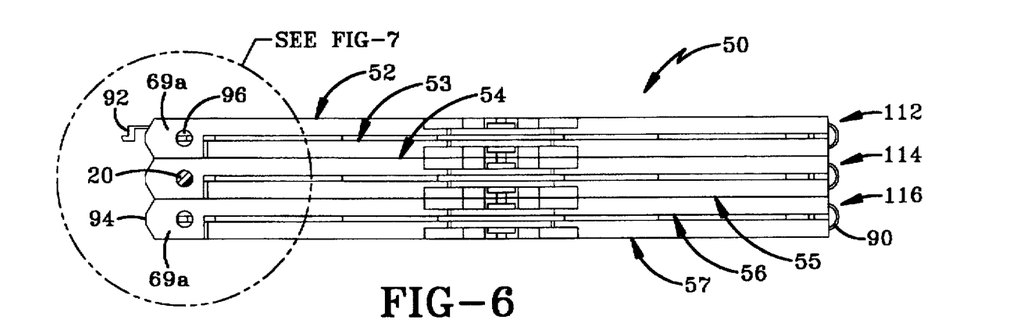
FIG. 6 is a side elevational view of the multi-media pages in an assembled position.
Figure 7:
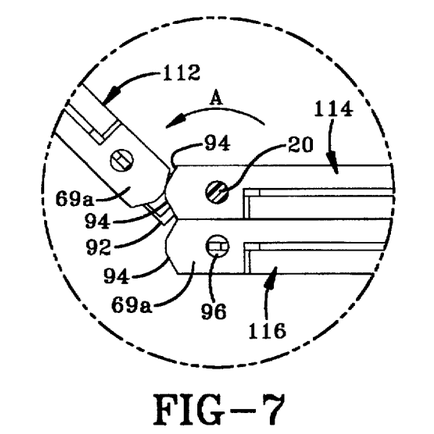
FIG. 7 is a greatly enlarged elevational view of the encircled portion of FIG. 6 having one of the pages cammingly engaging an adjacent page.

Hinge straps 90 extending between pages 53 and 54, and between pages 55 and 56 pivotally connect multi-media page 112, 114, and 116 and allow the multi-media pages to be flipped from the horizontal position shown in FIG. 6 to the vertically upright position shown in FIGS. 2 and 7. Hinge straps 90 extending between pages 53 and 54 sit within U-shaped cut-outs 101 of wall 69 of page 52, and hinge straps 90 extending between pages 55 and 56 sit within U-shaped cut-outs 101 of wall 69 of hinge page 54 to allow walls 68, 69 and 69a to sit flush in juxtaposition against one another forming a stack of multi-media pages as shown in FIG. 6.

Figure 8:
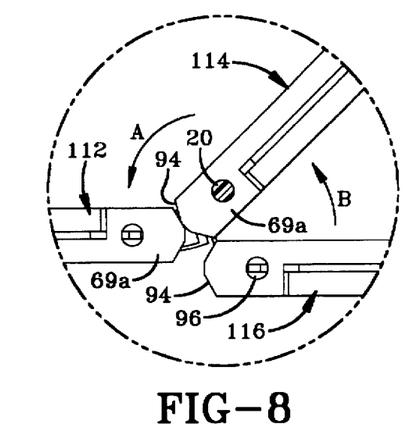
FIG. 8 is an elevational view similar to FIG. 7 showing the further pivotal cam action of the multi-media pages from the previous position of FIG. 7.

Tapered ends 94 of first hinge pages 52, 54 and 56 cooperate to produce a cam action which flips the adjacent multi-media page to a displayed position (FIG. 7) when an adjacent multi-media page is manually pivoted to the horizontal position (FIG. 8), to facilitate viewing and removal of compact discs 80. When multi-media page 112 is manually flipped in the direction of arrow A (FIG. 7), tapered end 94 of hinge page 52 contacts tapered end 94 of hinge page 54 and the relationship between the respective tapered ends 94 and hinge straps 90 produces a torque on multi-media page 114 in the direction of arrow B (FIG. 8) which causes multi-media page 114 to pivot to the displayed position of FIG. 8.

Similarly, when page 114 is pivoted in the direction of arrow A from the upright position to the horizontal position, end 94 of hinge page 54 cooperates with end 94 of hinge page 56 and straps 90 extending therebetween to produce a torque which pivots multi-media page 116 to the displayed position. The complementary shape of each side of ends 94 causes the multi-media pages to pivot in a similar manner to that described above when the pages are flipped in a direction opposite to that of arrows A and B. Multi-media pages 112, 114 and 116 are capable of holding one compact disc 80 on each side thereof and present the compact disc for viewing or removal thereof when the multi-media pages are in the upright position.

Graphics 84 are inserted into side-loading graphics pocket 120 and are held therein until removed by a user. Side-loading graphics pocket 120 allows the multi-media pages to be flipped in the direction of arrow A (FIG. 7) and prevents the graphics from sliding out of the pocket when the pages are flipped for viewing by the user. Crescent-shaped indent 82 allows the user to grasp the end of graphics 84 and slide the graphics from pocket 120 for viewing when desired.

Figure 10:
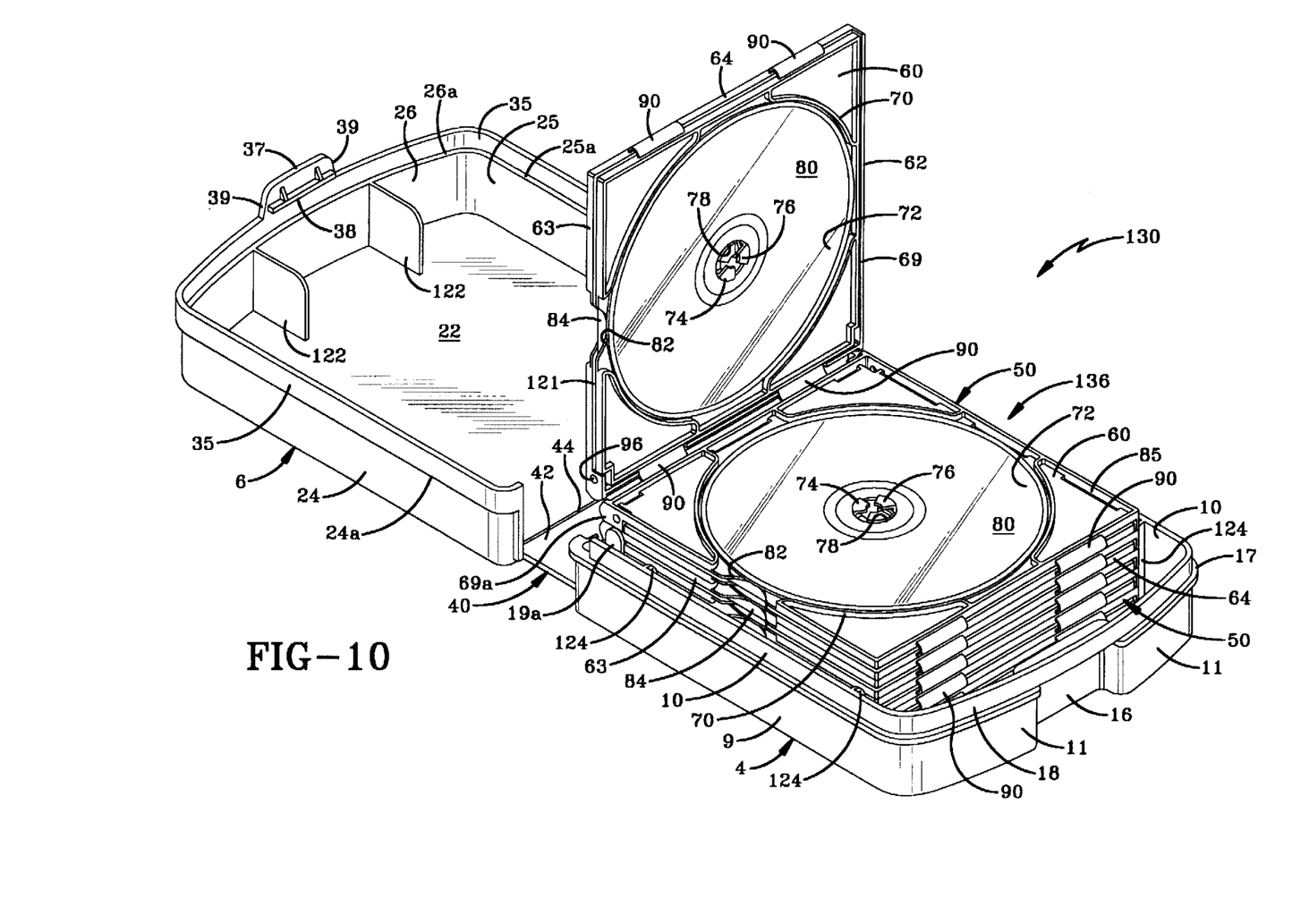
FIG. 10 is a perspective view similar to FIG. 2, of the second embodiment in a full open position showing a first multi-media page in an upright vertical position.

A second embodiment of the carrying case is shown in FIG. 10 and is indicated generally at 130. Case 130 is similar to case 1 and includes base 4 pivotally connected to lid 6 by hinge assembly 40. Walls 9-11 and 24-26 of case 130 are higher than the walls of case 1 to allow case 130 to hold a page assembly 136 which is capable of storing up to twelve compact discs 80. Page assembly 136 consists of a pair of interconnected page assemblies 50, each of which includes six hingedly connected multi-media pages.

Hinge page 56 of a top page assembly 50 is positioned adjacent hinge page 52 of a bottom page assembly 50 and L-shaped outer ends 92 of hinge straps 90 of hinge page 52 are placed within cut-outs 101 of hinge page 56. The outwardly extending tip of ends 92 sit against bottom wall 60 of hinge page 56 and the vertically extending portion of ends 92 is positioned against the inner surface of wall 69. Hinge page 57 is pivoted and latched to hinge page 56 sandwiching ends 92 of hinge page 52 between hinge pages 56 and 57 of the top page assembly hingedly interconnecting top and bottom page assemblies 50.

The hinged interconnection of page assemblies 50 causes a camming action between multi-media page 116 of the top page assembly and multi-media page 112 of the bottom page assembly similar to the camming action between multi-media pages 112, 114 and 116 of page assembly 50 of case 1 as described above. The manual pivotal movement of one multi-media page of page assembly 136 causes an adjacent multi-media page to pivot to the upright position to facilitate viewing and removal of compact discs 80. Pivot pins 20 extend within holes 96 and openings 100 of hinge page 56 of the top page assembly to pivotally mount page assembly 136 within case 130 (FIG. 10).

Outer ends 92 of hinge page 52 allow multiple page assemblies 50, each of which is capable of holding six compact discs, to be joined to form page assemblies capable of holding any number of compact discs which is a multiple of six. It is also understood that page assembly 50 can be molded to have any even number of hingedly connected hinge pages.

Accordingly, page assemblies 50 are molded as a one-piece member or strip member 59 of a plastic material with hinge pages 52-57 joined by hinge straps 90. Second hinge pages 53, 55 and 57 pivot toward and latch to first hinge pages 52, 54 and 56, respectively, forming multi-media pages 112, 114 and 116. The multi-media pages hold one compact disc 80 on each side thereof and side-loading graphics pocket 120 retains graphics 84 and prevents the graphics from sliding therefrom when the multi-media pages are flipped between the horizontal and upright positions. The tapered truncated configuration of ends 94 and the hinged connection between the multi-media pages causes a camming action which pivots one multi-media page to the upright position when an adjacent multi-media page is pivoted to the horizontal position. Top and bottom page assemblies 50 of case 130 are hingedly joined by outer end 92 of hinge page 52 of the bottom page assembly which is sandwiched and retained between hinge pages 56 and 57 of the top page assembly.

Accordingly, the improved carrying case is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved carrying case is constructed and used, the characteristics of the construction, and the advantageous, new and useful results obtained; the new and useful structures, devices, elements, arrangements, parts and combinations, are set forth in the appended claims.

We claim:

1. A carrying case for disc-shaped data storage media and associated graphics including:
    (a) a base;
    (b) a lid;
    (c) first hinge means for hingedly connecting said base to said lid to form a storage chamber therebetween;
    (d) a page assembly pivotally mounted within the storage chamber, said page assembly including:
        (i) a plurality of first and second pages each having first and second ends wherein the first end of said first pages is hingedlly connected to the second end of an adjacent one of said second pages; wherein the second end of said first pages is hingedly connected to the first end of another adjacent one of said second pages; and wherein outermost first and second pages include first and second free ends, respectively;
        (ii) second hinge means for hingedly connecting said first pages to said second pages;
        (iii) latching means formed on said first and second pages for latching said first pages in juxtaposition to said second pages to form a plurality of multi-media pages, with a graphics storage compartment being formed between said first and second pages in each of said multi-media pages; and
        (iv) a hub formed on an outer surface of each of said first and second pages for supporting a disc-shaped data storage medium on said outer surface; and
    (e) third hinge means for pivotally mounting said page assembly in said storage chamber.

2. The case defined in claim 1 wherein the first hinge means includes an elongated panel and a pair of reduced thickness living hinges, said living hinges connecting said panel between the base and the lid.

3. The case defined in claim 1 wherein the third hinge means includes a pair of lugs extending outwardly from the base and a pair of pivot pins which pivotally mount the page assembly on said lugs, said pivot pins forming a pivot axis.

4. The case defined in claim 1 wherein each of said first and second pages includes a rectangular-shaped flat bottom wall having a peripheral upstanding first wall extending outwardly from the outer surface of said first and second pages.

5. The case defined in claim 4 wherein the second hinge means includes a pair of spaced parallel flexible hinge straps which extend from the first wall intermediate an outer edge of said first wall and an inner surface of the bottom wall of said first and second pages located opposite the outer surface thereof; and wherein certain of said second hinge means hingedly connect the multi-media pages to one another.

6. The case defined in claim 5 wherein a pair of generally U-shaped cut-outs are formed in the outer surface of the first wall of certain of the first pages along the first end thereof, said cut-outs receive the certain of said second hinge means which hingedly connect the multi-media pages together.

7. The case defined in claim 1 wherein a wall is formed on a surface of each of said first pages opposite the outer surface and along the first end and a first side of said first pages; and wherein the latching means includes a plurality of slots formed in the first pages, a plurality of latching shoulders which extend from the second wall of said first pages and which align with said slots, and an outwardly extending latching tab formed on the inner surface of the second pages, said latching tab having a barbed end which engages said latching shoulders.

8. The case defined in claim 1 wherein a pair of spaced parallel ridges are formed on a surface opposite the outer surface which extend parallel and adjacent to the first and second ends of the first pages; and wherein a pair of complementary-shaped grooves are formed in said surface of the second pages, said grooves receive said ridges to maintain a spaced relationship between the first and second pages for forming the storage compartment therebetween.

9. The case defined in claim 5 wherein a pair of tapered tabs extend outwardly from each of the multi-media pages adjacent the certain of said second hinge means to urge one multi-media page to a substantially vertical position when an adjacent multi-media page is pivoted to a substantially horizontal position.

10. The case defined in claim 1 which further includes first and second page assemblies which snap-fit with one another to hingedly connect said first page assembly with said second page assembly.

11. The case defined in claim 1 wherein the storage compartment has a opening formed therein along a second side of said multi-media pages for receiving the graphics.

12. An improved carrying case for disc-shaped data storage media and associated graphics of the type which includes a base hingedly connected to a lid by a hinge panel wherein the disc-shaped data storage media are supported on a page assembly which includes a plurality of first and second pages having first and second ends, the improvement comprising:
(a) providing the first end of said first pages hingedly connected to the second end of an adjacent one of said second pages; the second end of said first pages hingedly connected to the first end of another adjacent one of said second pages; and outermost first and second pages which include first and second free ends, respectively;
(b) second hinge means for hingedly connecting said first pages to said second pages;
(c) latching means formed on said first and second pages for latching said first pages to said second pages, said first and second pages forming a multi-media page when latched together by said latching means;
(d) a hub formed on a top surface of each of said first and second pages for supporting the disc-shaped data storage media; and
(e) a storage compartment formed between a bottom surface of said first and second pages when said first pages are latched to said second pages.

13. A carrying case for disc-shaped data storage media and associated graphics including:
(a) a base;
(b) a lid;
(c) first hinge means for hingedly connecting the base to the lid to form a storage chamber therebetween;
(d) a page assembly pivotally mounted within the base, said page assembly including:
(i) a plurality of pages pivotally joined together in an end-to-end series as a one-piece integral strip, said page forming a plurality of multi-media pages, each multi-media page being formed by a pair of said pages joined together in juxtaposition and providing a graphics storage compartment between each of said pair of joined pages;
(ii) latching means formed on said pages for latching adjacent pairs of said pages in juxtaposition to form said multi media pages and graphics storage compartments; and
(iii) a hub formed on an outer surface of certain of said pages for supporting the disc-shaped data storage media on said outer surfaces; and
(e) second hinge means for pivotally mounting the page assembly within the storage chamber.

14. The case defined in claim 13 including cam means formed on certain of the multi-media pages and engagable with similar cam means on an adjacent multi-media page to move said adjacent multi-media page toward an upward exposed position upon manual movement of one of said certain multi-media pages.

15. The case defined in claim 13 in which each of the multi-media pages is substantially rectangular having a pair of opposed ends and a pair of opposed sides; in which the second hinge means is located adjacent one of the opposed ends; and in which an opening is provided in one of the opposed sides to provide access into the graphics storage compartment.

16. The case defined in claim 13 in which the outer surfaces of said certain pages are formed with disc-shaped recesses, with the hub being centered therein, for receiving the disc-shaped storage media in said recess.

17. The case defined in claim 13 in which the one-piece integral strip includes six pages; in which attachment means are provided for joining together two of said strips to form a multiple page assembly; and in which said second hinge means pivotally mounts said multiple page assemble within the storage chamber.

* * * * *